United States Patent [19]

Seizew et al.

[11] Patent Number: 5,609,144
[45] Date of Patent: Mar. 11, 1997

[54] ARTICULATED EXHAUST GAS RECIRCULATION SUPPLY TUBE FOR AUTOMOTIVE ENGINE

[75] Inventors: Alex R. Seizew, Livonia; Lamar L. King, II, Dearborn, both of Mich.

[73] Assignee: Ford Motor Company, Dearborn, Mich.

[21] Appl. No.: 586,112

[22] Filed: Jan. 16, 1996

[51] Int. Cl.⁶ ............. F02M 25/07; F16L 27/113
[52] U.S. Cl. ............. 123/568; 285/223; 285/234
[58] Field of Search ............. 123/568, 569, 123/570, 571; 285/223, 231, 233, 234

[56] References Cited

U.S. PATENT DOCUMENTS

| | | | |
|---|---|---|---|
| 2,478,127 | 8/1949 | Parker | 285/234 |
| 3,002,269 | 10/1961 | Hopkins | 29/441.1 |
| 3,414,299 | 12/1968 | Roe | 285/234 |
| 3,727,955 | 4/1973 | Carter | 285/223 |
| 4,171,689 | 10/1979 | Eheim | 123/568 |
| 4,613,170 | 9/1986 | Kersting | 285/187 |
| 4,659,117 | 4/1987 | Holzhausen et al. | 285/49 |
| 4,747,624 | 5/1988 | Faber et al. | 285/187 |
| 4,792,161 | 12/1988 | Usui | 285/45 |
| 4,969,445 | 11/1990 | Hertweck et al. | 123/569 |
| 5,158,061 | 10/1992 | Monteith | 123/568 |
| 5,163,718 | 11/1992 | Cannon | 285/231 |
| 5,203,313 | 4/1993 | Rotarius | 123/568 |
| 5,425,347 | 6/1995 | Zinke, II | /123/568 |

FOREIGN PATENT DOCUMENTS

| | | |
|---|---|---|
| 2856450 | 4/1980 | Germany. |
| 436961 | 12/1974 | U.S.S.R.. |

*Primary Examiner*—Willis R. Wolfe
*Attorney, Agent, or Firm*—Jerome R. Drouillard

[57] ABSTRACT

An articulated exhaust gas recirculation supply tube for an automotive engine includes an inlet tube with a first end adapted for connection with a source of exhaust gas from an engine and a second end having telescoping joint portion. An outlet tube has a first end adapted for connection with an exhaust gas recirculation control and a second end having a telescoping joint portion. An articulated gas conducting joint is slidingly engaged with the telescoping joint portions of the inlet tube and the outlet tube. A gas sealing member extends about both the telescoping joint portions of the inlet and outlet tubes and the articulated gas conducting joint.

6 Claims, 1 Drawing Sheet

ARTICULATED EXHAUST GAS RECIRCULATION SUPPLY TUBE FOR AUTOMOTIVE ENGINE

BACKGROUND OF THE INVENTION

1. Field of the Invention

This invention relates to a tubular structure for conveying recirculated engine exhaust gas from a source of gas, such as an exhaust manifold, to a control element, such as an EGR valve.

2. Discussion of Prior Art

Exhaust gas recirculation ("EGR") systems have been in use for many years. The purpose of such systems is to convey a small portion of the exhaust gas leaving the engine to the inlet manifold. The recirculated exhaust gas aids in the control of oxides of nitrogen, and also helps to reduce the octane requirement of the engine.

EGR supply tubes form an integral part of many EGR systems. The purpose of the supply tube is to bring recirculated exhaust gas from a source of exhaust gas, such as an exhaust manifold, to the EGR control element, such as an EGR valve. Such an EGR tube operates in a difficult environment because the tube may be surrounded initially by sub-zero air. During normal engine operation, the tube may be heated to 1200° F. or even higher by exhaust gases passing therethrough. Moreover, this heating process, followed by cooling, is repeated every time the engine is shut down and allowed to cool to ambient temperature. Thus, the thermal stress imposed upon the EGR supply tube is substantial.

The large temperature excursions imposed on EGR tubes have caused designers to construct these tubes with bellows-like sections to accommodate the pronounced, thermally-induced, axial growth experienced with such tubes. Such bellows structures have not generally proven to be satisfactory because the high temperature of the exhaust gases moving through the EGR tube, coupled with the agitation provided by the interior surface of the convoluted walls of the bellows, have caused considerable heating of the bellows structure. This has proved to be unfortunate because stainless steels have generally been necessary to avoid corrosion resulting from hostile exhaust gases, and high temperature grain migration of the nickel portion of the stainless steel has caused embrittlement and subsequent failure of the bellows structure. In this regard, it is well to keep in mind that the environment that the EGR tube encounters is further rendered hostile by the high vibration forces associated with components bolted to internal combustion engines.

U.S. Pat. No. 4,171,689 to Eheim, and U.S. Pat. No. 4,969,445 to Hertweck et al, disclose bellows structures for handling exhaust gases. Neither of the structures disclosed in the '689 and '445 patents obviate the problems associated with prior art EGR supply tube bellows devices.

U.S. Pat. No. 5,158,061 to Monteith, which is assigned to the assignee of the present invention, while solving problems with axial growth of EGR tubes, does not provide flexibility in the bellows joint. Unfortunately, such flexibility is often needed to permit installation of the EGR tube at either the engine plant where the engine is assembled, or at the assembly plant, where the engine is installed in a vehicle.

It is an object of the present invention to provide an EGR supply tube which accommodates both axial growth of the tube due to heating and rotation of one part of the joint with respect to the other, without the problems associated with prior art bellows constructions.

It is an advantage of the present invention that an EGR tube according to this invention is robust in terms of its ability to withstand the adverse environment to which it must operate.

Other objects, features and advantages of the present invention will be apparent to the reader of this specification.

SUMMARY OF THE INVENTION

An articulated exhaust gas recirculation supply tube for an automotive engine includes an inlet tube with a first end adapted for connection with a source of exhaust gas from an engine and a second end having a telescoping joint portion. An outlet tube has a first end adapted for connection with an exhaust gas recirculation control and a second end having a telescoping joint portion. An articulated gas conducting joint is interposed between and slidingly engaged with the telescoping joint portion of the inlet tube and the telescoping joint portion of the outlet tube. An axially and rotationally compliant gas sealing member, which preferably comprises a convoluted tube member having ends which are generally coaxial with the axes of the inlet and outlet tubes, extends about the telescoping joint portions of said inlet and outlet tubes and about the articulated gas conducting joint.

According to another aspect of the present invention, the articulated gas conducting joint preferably comprises a hollow ball member adapted for sliding engagement with one of said telescoping joint portions and a socket member engaged with said ball member and adapted for sliding engagement with the other of said telescoping joint portions.

DETAILED DESCRIPTION OF PREFERRED EMBODIMENTS

Figure 1:
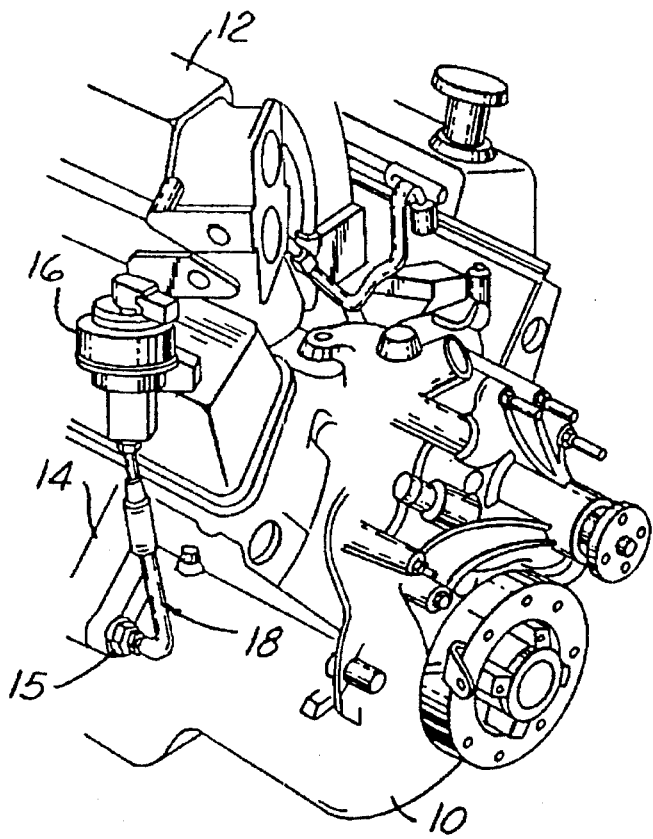
FIG. 1 is a perspective view of an automotive engine having an exhaust gas recirculation system including an EGR supply tube according to the present invention.

As shown in FIG. 1, an automotive type internal combustion engine, 10, is equipped with an intake manifold, 12, which admits not only air and fuel into the engine cylinders, but also recirculated exhaust gas. The recirculated exhaust gas is admitted to intake manifold 12 via EGR valve 16, which receives exhaust gas furnished by EGR supply tube 18. An exhaust manifold, 14, has a tap, 15, to which the inlet tube portion of EGR supply tube 18 is connected. Thus, it is readily apparent from FIG. 1 that EGR supply supply tube 18 extends between a source of exhaust gas at exhaust manifold 14 and an exhaust gas recirculation control, in this case, EGR valve 16. Because EGR supply tube 18 has considerable axial length, the tube will, due to thermal expansion, be subjected to considerable stress unless provision is made to accommodate axial growth of the tube.

An EGR supply tube according to the present invention is intended to accommodate thermal growth without compromising the integrity of the tube. It should be understood in this regard that if the supply tube develops a leak, objectionable exhaust noises and exhaust gas may emanate from the leaking portion of the tube.

With certain engines, the EGR supply tube is connected between fittings on the intake and exhaust manifolds which are located in such a manner as to render engagement of the EGR supply tube with the fittings a very difficult proposition in the event that the configuration of the EGR supply tube is not controlled with considerable precision during the manufacturing process. The present invention allows the EGR supply tube to rotate and thereby bend, as well as telescope, which promotes the mounting of the EGR supply tube upon the engine.

Figure 2:
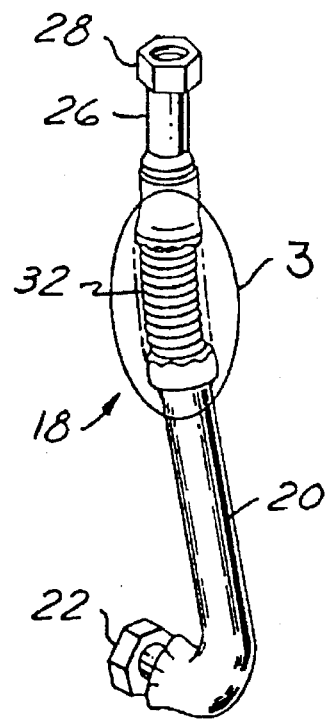
FIG. 2 is a perspective view of an EGR supply tube according to the present invention.

FIG. 2 illustrates an enlarged view of the EGR supply tube shown in FIG. 1. An inlet tube, 20, has a first end, 22, which is intended to be connected with a source of exhaust gas, such as exhaust manifold tap 15 of FIG. 1. Accordingly, first end 22 is shown with a conventional type of screw connector. Those skilled in the art will appreciate in view of this disclosure that a variety of connectors could be used at either end of supply tube 18 for the purpose of providing a gas tight, mechanically reliable, seal for attaching supply tube 18 between a source of exhaust gas and an EGR control such as EGR valve 16.

As is further shown in FIG. 2, an EGR supply tube as claimed in the present invention includes outlet tube 26 having a first end, 28, adapted for connection with an EGR control, such as EGR valve 16.

Figure 3:
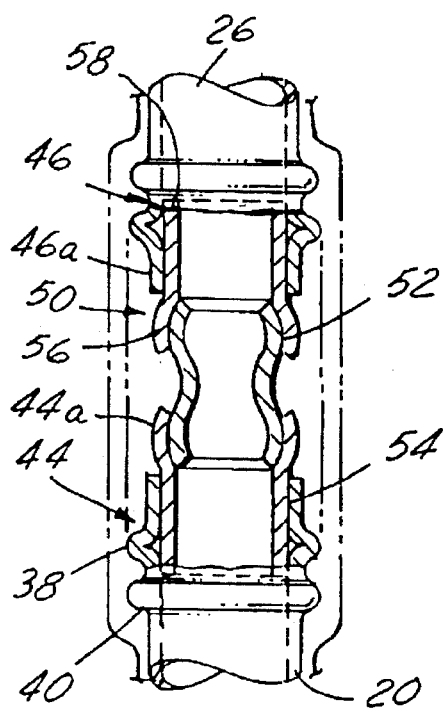
FIG. 3 is an enlarged section of the tube of FIG. 2 taken inside the region 3, as shown in FIG. 2.

FIG. 3 illustrates a section through the present EGR tube. Second end 44 of inlet tube 20 has telescoping joint portion 44a, which mates with articulated gas conducting joint 50.

The articulated gas conducting joint comprises hollow ball 52 which is integral with sleeve portion 54. Sleeve portion 54 is telescopically engaged with telescoping joint portion 44a of inlet tube 20. Articulated gas conducting joint 50 further comprises socket member 56 which is engaged with ball member 52. Socket member 56 is integral with sleeve portion 58, which is telescopically engaged with telescoping joint portion 46a of outlet tube 26.

Bellows 38, which serves as a gas sealing member extending about the telescoping joint portions of the inlet and outlet tubes as well as about articulated gas conducting joint 50, forms the final part of the joint between inlet tube 20 and outlet tube 26 of EGR supply tube 18.

Figure 4:
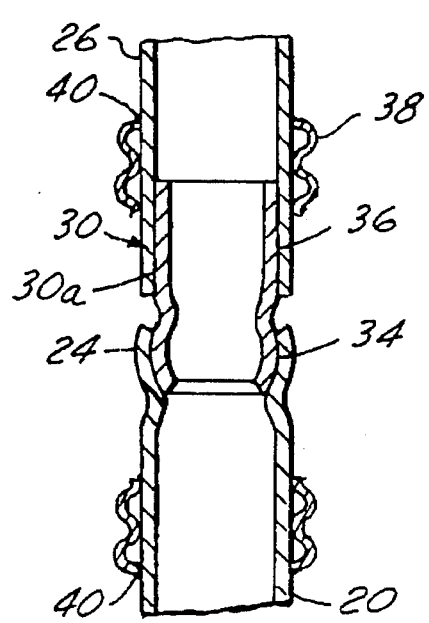
FIG. 4 is a sectional view of an articulated EGR supply tube according to the present invention having a single slip construction.

An alternate joint construction, having only a single slip joint feature, is shown in FIG. 4. As seen in FIG. 4, inlet tube 20 has female socket 24, which forms one portion of an articulated gas conducting joint. Outlet tube 26 has second end 30 with telescoping joint portion 30a, which forms the female portion of a telescoping or sliding joint. The male portion of this joint is provided by interconnecting section 32, which has as its first end sleeve portion 36, which is slidingly engaged with telescoping joint portion 30a. Interconnecting section 32 further comprises a first end, 34, formed as a hollow ball, which acts as the male portion of a ball and socket joint.

Each of the structures shown in the various Figures uses ball and socket construction, combined with at least one axial slip joint, to accomodate both thermal growth of the EGR supply tube and rotational movement required to permit installation of the tube upon an engine.

Gas sealing member 38 is shown in the various figures as a convoluted tube, which is generally coaxial with the axis of the tubes to which it is welded at 40. Together, the telescoping joint portions, the articulated gas conducting joint, and gas sealing member 38 seal exhaust gases from escaping the EGR supply tube while allowing axial growth and, to a limited extent, rotation of the supply tube. Importantly, the telescoping joint portions and the articulated gas conducting joint protect gas sealing member 38 from excessive heat contained in the flowing exhaust gas. In so doing, the embrittlement which might otherwise cause gas sealing member 38 to fail prematurely is avoided.

The convolutions in gas sealing member 38 allow the member to accommodate axial growth and rotational movement, sometimes termed bending, of the EGR supply tube, while maintaining a gas-tight seal between inlet tube 20 and outlet tube 26. The gas-tight seal is assured by welds 40, which are imposed at either end of gas sealing member 32.

While the best mode for carrying out the invention has been described in detail, those familiar with the arts to which this invention relates will recognize alternative designs and embodiments for practicing the invention. Thus, the above-described preferred embodiment is intended to be illustrative of the invention, which may be modified within the scope of the following claims.

What is claimed is:

1. An articulated exhaust gas recirculation supply tube for an automotive engine, comprising: an inlet tube with a first end adapted for connection with a source of exhaust gas from an engine and a second end having a telescoping joint portion;

an outlet tube with a first end adapted for connection with an exhaust gas recirculation control and a second end having a telescoping joint portion;

an articulated gas conducting joint interposed between and slidingly engaged with the telescoping joint portion of said inlet tube and the telescoping joint portion of said outlet tube; and a gas sealing member extending about the telescoping joint portions of said inlet and outlet tubes and said articulated gas conducting joint.

2. An exhaust gas recirculation supply tube according to claim 1, wherein said gas sealing member is axially and rotationally compliant.

3. An exhaust gas recirculation supply tube according to claim 2, wherein said gas sealing member comprises a convoluted tube which is generally coaxial with the axis of the telescoping joint portions of said inlet and outlet tubes.

4. An articulated exhaust gas recirculation supply tube according to claim 1, wherein said articulated gas conducting joint comprises a hollow ball member adapted for sliding engagement with one of said telescoping joint portions and a socket member engaged with said ball member and adapted for sliding engagement with the other of said telescoping joint portions.

5. An exhaust gas recirculation supply tube for an automotive engine, comprising:

an inlet tube with a first end connected to a source of exhaust gas from said engine and a second end having one portion of an articulated gas conducting joint;

an outlet tube with a first end connected to an exhaust gas recirculation valve and a second end having a telescoping joint portion; and an interconnecting section having a first end in articulated engagement with the second end of the inlet tube and a second end telescopically engaged with the second end of the outlet tube; and an axially and rotationally compliant gas sealing member comprising a hollow, generally cylindrical body extending about and encapsulating the second end of the inlet tube, the interconnecting section, and the second end of the outlet tube.

6. An articulated exhaust gas recirculation supply tube according to claim 5, wherein said gas sealing member comprising a convoluted tube having ends which are generally coaxial with the axes of the inlet and outlet tubes.

* * * * *